United States Patent [19]

Murata et al.

[11] 4,326,667
[45] Apr. 27, 1982

[54] AUTOMATIC TEMPERATURE ADJUSTING TYPE AIR CONDITIONER

[75] Inventors: Yukiho Murata, Yokohama; Yasushi Inoshita, Tokyo, both of Japan

[73] Assignee: Nissan Motor Company, Limited, Tokyo, Japan

[21] Appl. No.: 217,750

[22] Filed: Dec. 18, 1980

[30] Foreign Application Priority Data

Dec. 25, 1979 [JP] Japan ............................. 54-180105[U]

[51] Int. Cl.³ ............................................. B60H 1/12
[52] U.S. Cl. .................................. 237/12.3 A; 74/109; 74/110; 236/13
[58] Field of Search ............. 236/13, 49; 237/12.3 A; 165/25, 16; 74/109, 110

[56] References Cited

U.S. PATENT DOCUMENTS

| | | | |
|---|---|---|---|
| 1,040,912 | 10/1912 | Eubank | 74/109 |
| 2,856,131 | 10/1958 | Conlan | 236/13 |
| 3,428,115 | 2/1969 | Caldwell | 236/13 X |
| 3,650,318 | 3/1972 | Avery | 236/13 X |
| 3,718,281 | 2/1973 | Beatenbough et al. | 165/16 X |
| 3,983,930 | 10/1976 | Franz | 236/13 X |
| 4,134,542 | 1/1979 | Sugiura | 236/13 |
| 4,267,968 | 5/1981 | Scott | 236/49 |

*Primary Examiner*—William E. Tapolcai, Jr.
*Attorney, Agent, or Firm*—Lane, Aitken, Kice & Kananen

[57] ABSTRACT

An air conditioner of an automatic temperature adjusting type used particularly for controlling the air temperature within a passenger compartment of an automotive vehicle. According to the present invention, the air conditioner controls simultaneously the air flow rate of a fan providing the air supply, and an air mixing door which controls the flow of air through either a heater or a bypass around the heater. The control is such that over an intermediate portion of the adjustment range the fan and air mixing door are operated together whereas at end portions of the adjustment range the fan is adjusted without moving the air mixing door. This is achieved by use of a particularly convenient gear mechanism of novel design.

5 Claims, 8 Drawing Figures

AUTOMATIC TEMPERATURE ADJUSTING TYPE AIR CONDITIONER

BACKGROUND OF THE INVENTION (1) Field of the Invention

The present invention relates to an automatic temperature adjusting type air conditioner particularly used for an automotive vehicle passenger compartment which carries out independently air flow rate adjustments for a blowing fan and an angular movement adjustment for an air mixing door using only a single power servomechanism.

(2) Description of the Prior Art

In recent years, on most automotive vehicles an air conditioner has been mounted to provide warm air or cooled air within the passenger compartment.

Such an air conditioner, in general, comprises a duct, a blowing fan, an evaporator located downstream of the fan, and a heater core through which engine cooling water is circulated. Furthermore, downstream of the evaporator an air passage is provided for bypassing the heater core and an air mixing door is provided at a branch portion between the heater core and its bypass passage for controlling the air flow passage. An air mixing chamber is formed downstream of the bypass passage from which the conditioned air is blown into the passenger compartment through a plurality of ventilators.

An such an air conditioner of an automatic temperature adjusting type has been proposed which maintains the temperature and humidity within the passenger compartment comfortable.

In other words, the air mixing door is operated by a linkage driven by a power servomechanism. A fan switch is provided to control the air flow rate of the fan according to the stroke at which an extendable arm attached to the power servomechanism is extended.

The power servomechanism is connected to a transducer such as a double solenoid vacuum valve having two electromagnetic valves; one of which is connected to a vacuum source such as a vacuum tank and the other connected to the atmosphere. The double solenoid vacuum valve controls a vacuum pressure to be conveyed to the power servomechanism depending on the voltage energizing the solenoid thereof. The energizing voltage is in turn controlled by a plurality of temperature sensors located, e.g., inside and outside the passenger compartment. These temperature sensors detect the air temperature by the change in their resistances with respect to the temperature. Input terminals of an automatic temperature adjusting amplifier are connected to these sensors and to a temperature setting resistor to compare the voltages between them. Thus when the difference exists in the compared result, the output voltage according to the difference is fed into the double solenoid vacuum valve so that the vacuum pressure to be conveyed to the power servomechanism is changed.

When the temperature adjustment and dehumidification are performed within the passenger compartment, both evaporator and heater core are operated and simulataneously the air mixing door is swung up at a suitable angle. Under such condition, the fan introduces fresh air into the duct and the evaporator cools and dehumidifies the air. Part of the cooled air is passed through the heater core to raise the temperature. After mixing the cooled air flowing through the bypass and warm air flowing through the heater core in the air mixing chamber, the mixed and conditioned air is blown out of the ventilators into the passenger compartment. The rate of air flow through the blowing fan is the greatest at the maximum or minimum stroke position of the power servomechanism and the fan switch is predetermined so that the amount of air flow gradually decreases toward the center position of the power servomechanism.

However, in such a conventional automatic temperature adjusting type air conditioner, the cooling function is often performed using only cooled air from the evaporator passing through the bypass passage. At this time, the air mixing door is in the maximum cooling position; in other words, the cooling function is performed with the cooled air from the evaporator not passing through the heater core. When the power servomechanism is operated with the passenger compartment gradually cooled, the amount of air flow from the fan is gradually reduced and the air mixing door is swung from the maximum cooling position to an air mixing position. In other words, part of the cooled air is passed through the heater core, thus sharply reducing the cooling capability. Since the power servomechanism is again operated to cool the passenger compartment to meet a temperature set by the driver, hunting tends to develop. Such hunting seriously reduces the efficiency of cooling the passenger compartment.

Hunting also develops when the air mixing door is in the maximum heating position; in other words, when the power servomechanism is operated to cool the passenger compartment from the state in which the air mixing door closes the bypass passage.

SUMMARY OF THE INVENTION

According to the present invention, there is provided an air conditioner of an automatic temperature adjusting type in which a centain number of racks and pinions are disposed suitably between an extendable arm of a power servomechanism operating according to a vacuum pressure and an air mixing door for mixing cooled air and heated air, whereby the rate of air flow from the fan can be ajusted without moving the air mixing door when the air mixing door is at either of its extreme positions.

BRIEF DESCRIPTION OF THE DRAWING

The features and advantages of the air conditioner according to the present invention will be better appreciated from the following description and drawings in which like reference numerals designate corresponding elements and in which.

DETAILED DESCRIPTION OF THE PREFERRED EMBODIMENTS

Figure 1A:
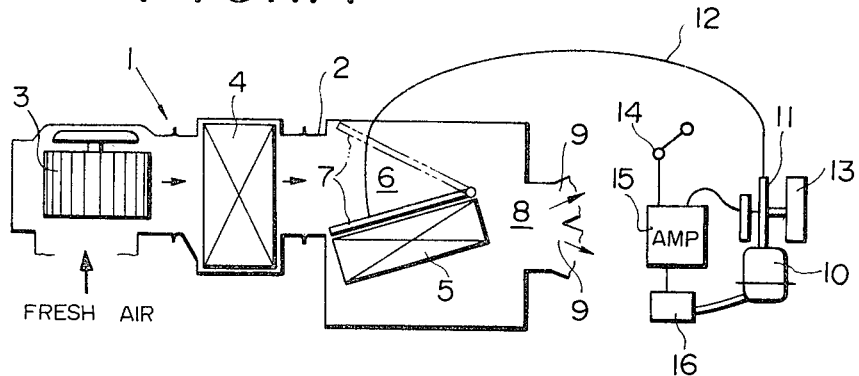
FIG. 1A is a simplified drawing of a conventional automatic temperature adjusting type air conditioner.

Reference will be made to the drawings and first of FIG. 1 in which an automatic temperature adjusting type air conditioner is briefly illustrated.

As shown in FIG. 1, a conventional automatic temperature adjusting type air conditioner 1 can roughly be divided into two sections: one air conditioning section and the other temperature adjusting section. The air conditioning section comprises a duct 2, a fan 3 located at the left side of the duct 2 for blowing air from an intake of the duct 2, an evaporator 4 located at the central position of the duct 2 for cooling the air by evaporation, a heater core 5 located at the right side of the evaporator 4, an air mixing door 7 located between the evaporator and heater core, a bypass 6 located at the upper portion of the heater core, an air mixing chamber 8, and a plurality of ventilators 9 located at the right side of the duct 2 for ventilating the air into the passenger compartment. The temperature adjusting section comprises: a linearly actuating means of a power servomechanism 10 having an extendable arm 11 protruded from the power servomechanism body for extending the extendable arm 11 at a stroke according to the input air pressure value; a fan switch 13 located adjacent to the extendable arm 11 for controlling the rate of air flow of the fan 3; a transducer of a double solenoid vacuum valve 16 connected to the power servomechanism 10 and having two electromagnetic valves, one connected to a vacuum tank and the other to the atmosphere; an automatic temperature adjusting amplifier 15 connected to the two electromagnetic valves of the double solenoid vacuum valve 16 for comparing a predetermined temperature setting value with a total voltage value obtained from a plurality of temperature sensors 14. The plurality of temperature sensors 14 comprise generally a dialed temperature control potentiometer, an ambient automotive vehicle temperature sensor having a negative resistivity with respect to the temperature, a temperature sensor located at the front of the vehicle compartment, a temperature sensor located at the rear of the passenger compartment, and a feedback potentiometer located on the extendable arm 11 of the power servomechanism 10.

In the configuration shown in FIG. 1A, the air conditioner 1 operates so as to actuate only the heater core 5 when maximum heating operation to raise a temperature within the passenger compartment is performed and operates so as to actuate only the evaporator 4 when maximum cooling operation to reduce a temperature within the passenger compartment is performed.

On the other hand, when air temperature within the passenger compartment is being continuously regulated and dehumidification performed, the air conditioner 1 operates so as to actuate both the evaportor 4 and heater core 5 and the air mixing door 7 is opened at an appropriate angle. The air introduced from the fan 3 is cooled and dehumidified by the evaporator 4 and part of the cooled air is heated by the heater core 5. The cooled and warmed air is mixed at the air mixing chamber 8 and blown from the ventilators 9 into the passenger compartment.

In this type of air conditioner 1, there is provided a fan switch 13, having a variable resistor of such a construction as described below for changing the fan speed, and connected to a DC power supply via an ignition switch and to the fan 3 for maximizing the rate of air flow of the fan 3 when the extendable arm 11 is at either maximum or minimum stroke position and gradually reducing the rate of air flow of the fan 3 as the extendable arm 11 approaches the midway position.

Figure 1C:
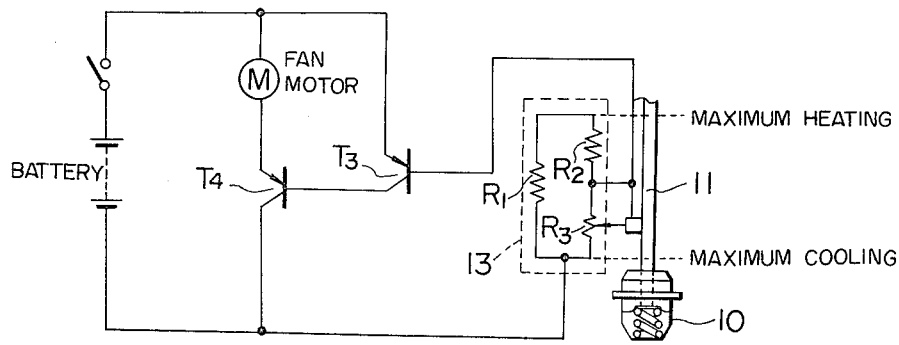
FIG. 1C is a circuit diagram and two graphs showing the fan motor applied voltage thus the fan speed is dependent on the stroke at which th extendable arm shown in FIG. 1A and FIG. 1B extends.
Figure 1C:
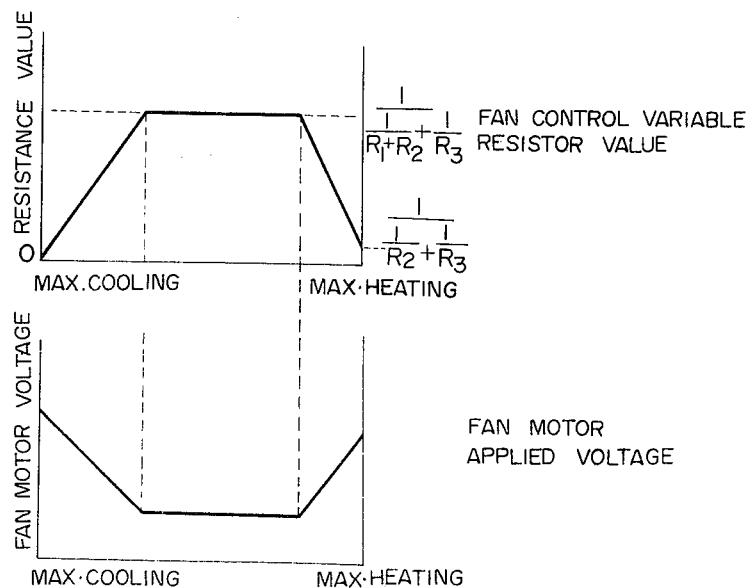
Figure 1B:
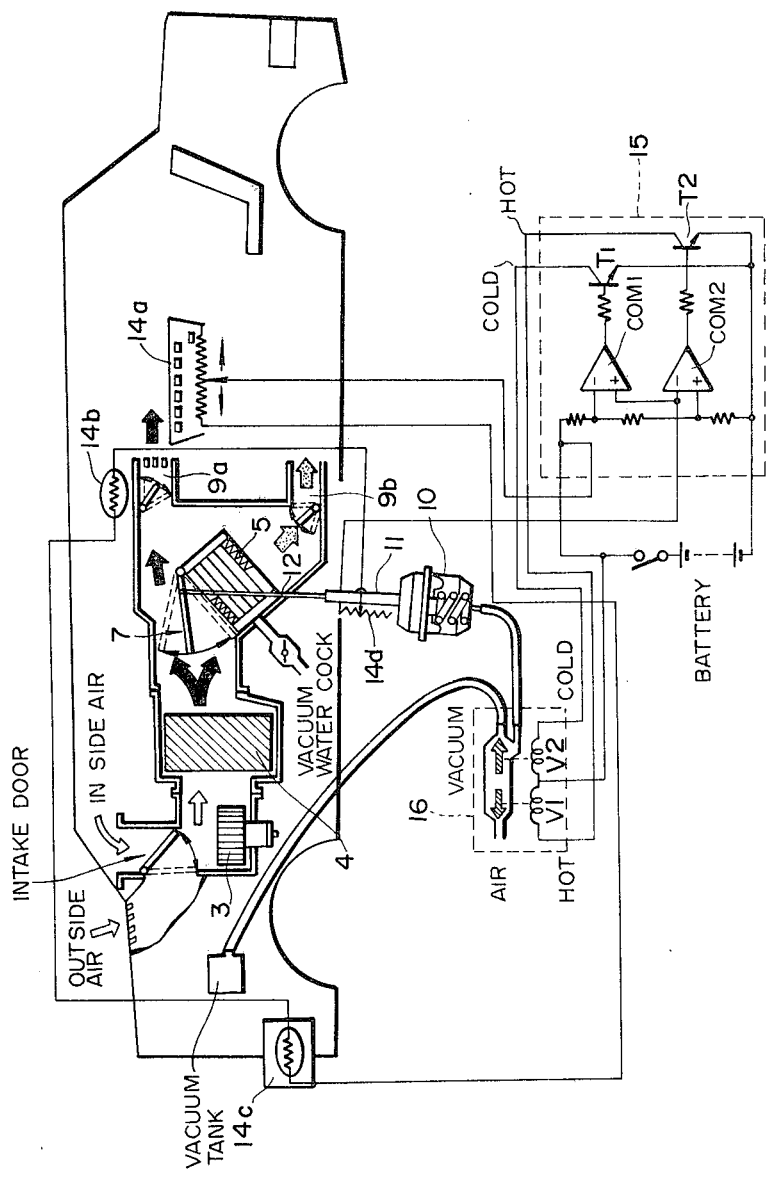
FIG. 1B is a detailed drawing of a conventional automatic temperature adjusting type air conditioner shown in FIG. 1A when actually mounted in an automotive vehicle for clearly explaining the operation.

FIG. 1B illustrates the automatic temperature adjusting type air conditioner shown in FIG. 1A when mounted actually in an automotive vehicle.

In FIG. 1B, the plurality of temperature sensors 14 shown in FIG. 1A comprise a temperature control variable resistor $14a$ attached to the instrument panel in the passenger compartment, an incar temperature sensor $14b$ within the passenger compartment, and an ambient temperature sensor $14c$ located at the front portion outside the passenger compartment, and a feedback potentiometer $14d$ attached to the extendable arm 11 of the power servomechanism 10. the incar sensor $14b$ may be located at the front seat, rear seat or both. The plurality of ventilators 9 comprises an outlet with ventilator door $9a$ located near the temperature control variable resistor $14b$ and a defrost door with a floor outlet $9b$ located at the floor portion of the passenger compartment. The automatic temperature adjusting amplifier 15 comprises two voltage comparators $COM_1$ and $COM_2$ for comparing a reference voltage produced by divided resistors with a voltage produced by the temperature sensors 14. Furthermore, each output terminal of the comparators $COM_1$ and $COM_2$ is connected to each base terminal of transistors $T_1$ and $T_2$ via a resistor. A collector terminal of the transistor $T_1$ is connected to one of the electromagnetic valves $V_2$ of the double solenoid vacuum valve 16 for operatively sending a vacuum from a vacuum tank to the power servomechanism 10. Another collecter terminal of the transistor $T_2$ is connected to the other of electromagnetic valves $V_1$ for operatively sending the air to the power servomechanism 10.

In the configuration shown in FIG. 1B, e.g., when the temperature control variable resistor 14 is turned, for example, toward the left-hand direction to change a set temperature from 25° C. to 20° C., the resistance value of the temperature control variable resistor 14 is reduced from, for example, about 850 ohms to zero ohm so that the total resistance connected to the automatic temperature adjusting amplifier 15 is reduced by about 850 ohms.

At this time, the voltage of a positive input terminal of the comparator $COM_1$ becomes higher than that of a negative input terminal thereof so that the transistor $T_1$ turns on and the electromagnet valve $V_2$ is operated to convey a vacuum to the power servomechanism 10. Consequently, the extendable arm 11 is pulled toward the power servomechanism body so that the air mixing door 7 is swung toward to heater core side to reduce the temperature. When the stroke of the extendable arm 11 is shortened, the resistance value of the feedback potentiometer $14d$ becomes larger to compensate for the total resistance value. Consequently, the voltage of the positive input terminal of the comparator $COM_1$ becomes equal to that of the negative input terminal thereof so that the transistor $T_1$ turns off and the electromagnet valve $V_2$ is closed. Therefore, the extendable arm 11 stops at the stroke position.

Since the passenger compartment is cooled with the extendable arm 11 stopped, the resistance value of the incar sensor 14b is raised because of its negative resistivity.

At this time, the voltage of a negative input terminal of the comparator $COM_2$ becomes lower than the reference voltage of a positive input terminal thereof so that the transistor $T_2$ turns on and the electromagnet valve $V_1$ is opened to the air to extend the extendable arm 11 due to the spring force of the power servomechanism 10. Consequently, the air mixing door 7 is swung away from the heater core side to rewarm the air within the passenger compartment. Since the stroke of the extendable arm 11 becomes longer, the resistance value of the feedback potentimeter 14d becomes lower to compensate for the increased total resistance value. At this time, the negative terminal of the comparator $COM_2$ becomes equal voltage to or higher than the positive terminal thereof so that the transistor $T_1$ turns off and the electromagnetic valve $V_1$ is closed. Therefore, the extendable arm 11 stops at the stroke position.

Next, e.g., when the ambient temperature of the automotive vehicle is raised, the resistance value of the ambient temperature sensor is conversely reduced so that the total resistance value of these temperature sensors 14 is reduced. At this time, the transistor $T_1$ within the automatic temperature adjusting amplifier 15 turns on to open the electromagnetic valve $V_2$ of the double solenoid vacuum valve 16. Consequently, the extendable arm 11 is pulled a stroke toward the power servomechanism body and correspondingly the air mixing door 7 is swung toward the heater core side. At this time, the resistance value of the feedback potentiometer 14d is increased to compensate for the decrease of the total resistance value. Then the transistor $T_1$ within the automatic temperature adjusting amplifier 15 turns off and the electromagnetic valve $V_2$ is closed. Consequently, the extendable arm 11 stops at the stroke described above.

In this way, the automatic temperature adjustment is made according to the change in the total resistance value of these temperature sensors 14.

In addition, FIG. 1C shows the relationship between the stroke change of the extendable arm 11 shown in FIG. 1A and FIG. 1B and change of the fan motor applied voltage thus change in the air flow rate of the fan.

The fan 3 as shown in FIG. 1A and FIG. 1B rotates by means of, e.g., a motor M, whose speed is directly proportional to the voltage across the motor M.

In FIG. 1C, one terminal of the motor M is connected to a positive pole of a DC power supply and an emitter of a transistor $T_3$. The other terminal of the motor M is connected to an emitter of a transistor $T_4$. The collector of the transistor $T_4$ is connected to a negative pole of the battery. The base of the transistor $T_4$ is connected to the collector of the transistor $T_3$. These transistors $T_3$ and $T_4$ constitute a fan control amplifier. The base of the transistor $T_3$ is connected to a slidable contact which moves with the extendable arm 11 of the power servomechanism 10 and also connected to a central position between the resistors $R_2$ and $R_3$ of the variable resistor of the fan switch 13 shown in FIG. 1A. A resistor $R_1$ is connected to the resistor $R_2$ and to the collector and the negative pole of the battery. The slidable contact moves between the resistors $R_2$ and $R_3$ as the extendable arm 11 extends between the maximum heating position and maximum cooling position. While the extendable arm 11 is at the maximum cooling position, the total fan control resistor becomes zero since the sidable contact connected to the base of transistor $T_3$ is positioned below the resistor $R_3$ to shorten the fan control resistor.

When the extendable arm 11 and the slidable contact come at the center position between the resistors $R_2$ and $R_3$, the total fan control resistor increase and becomes such an equation:

$$R = \frac{1}{\frac{1}{R_1 + R_2} + \frac{1}{R_3}}$$

The equation holds until the slidable contact comes the upper position of the resistor $R_2$. While the slidable contact and extendable arm 11 extend at the maximum beating position, the total fan resistor value decreases and becomes such an equation:

$$R = \frac{1}{\frac{1}{R_1} + \frac{1}{R_3}}$$

Therefore, it will be seen in the graph showing the relation between the fan control resistor value and extendable arm (or, slidable contact) stroke position that the fan control resistor value changes substantially in a trapezoidal form. Correspondingly, since the emitter-to-collector voltage of the transistor $T_4$ changes according to the total fan variable resistor, the applied voltage of the fan motor M is changed as shown in the graph indicating the relation between the fan motor voltage V and extendable arm stroke position.

It will be seen that the fan motor voltage is lowest near the central portion of the extendable arm 11 so that the fan air flow rate is smallest when the extendable arm 11 is positioned near the central position between maximum heating and cooling positions.

(However, cooling is frequently performed with the air mixing door 7 completely opened (swung to the heater core) so that the air from the fan 3 is wholly bypassed via the evaporator 4 to the bypass passage 6.)

At this time, the passenger compartment is gradually cooled to a very low temperature. Thereafter, when the power servomechanism 10 operates to rewarm the passenger compartment according to the level change of a signal fed fromthe temperature sensors in response to the cooling operation, the rate of air flow of the fan 3 is decreased and the air mixing door 7 also changes its angular position from the maximum cooling position to an air mixing position, i.e., part of the cooled air passes through the heater core 5, and thereby the cooling efficiency of the air conditioner 1 is lowered rapidly.

Therefore, the power servomechanism 10 returns to cooling the passenger compartment so that hunting develops. Such hunting causes the cooling performance of the air conditioner 1 to be severely reduced.

Such an unfavorable phenomenon as hunting also occurs when the power servomechanism 10 operates so as to cool the passenger compartment after the air heating and dehumidification have been performed with the air mixing door 7 fully closed to admit the air from the fan 3 through the heater core 5.

With reference to first FIG. 2, preferred embodiments of the present invention will now be described.

Figure 2:
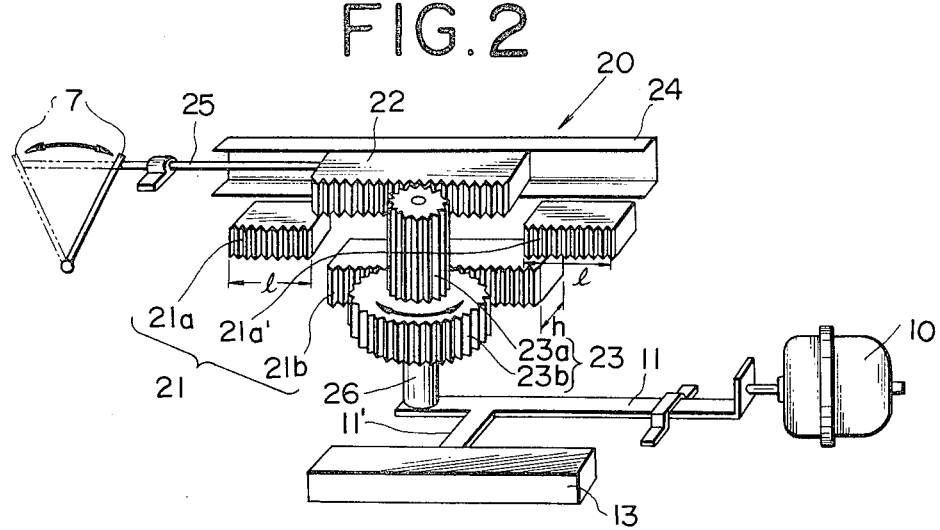
FIG. 2 is a persepective drawing of a gear mechanism which performs the angular displacement of the air mixing door of a preferred embodiment according to the present invention.

In FIG. 2 showing a first embodiment of the present invention, it will be seen that the power servomechanism 10 is provided with the extendable arm 11. The extendable arm 11 has a strip 11' projecting sideways and attached to the fan switch 13 so that the total resistance value of the fan switch 13 can be varied. Hence, the position of the strip 11' within the fan switch 13 adjusts the rate of the fan motor speed and therefore the rate of air flow of the fan 3 not shown in the drawing. Numeral 20 denotes a gear mechanism according to the present invention disposed between the extendable arm 11 and air mixing door 7. The gear mechanism 20 is disposed so as to operate in the range of approximately the full stroke of the extendable arm 11. Furthermore, the gear mechanism 20 comprises a fixed rack 21 suitably mounted on the side surface of the air conditioner 1 not shown in the drawing, a movable rack 22 connected to the air mixing door 7 for angularly moving the air mixing door 7, and a pinion 23 meshed with the fixed and movable racks 21 and 22, and pivotally mounted on the extendable arm 11. The fixed rack 21 comprises first and second fixed racks 21a and 21a' located at left-hand and right-hand positions whose teeth pitches are the same as those of the movable rack 22 and a third fixed rack 21b located at a central position between the first and second fixed racks 21a and 21a'. The length l of each of the two fixed racks 21a and 21a' is slightly longer than the movable distance of the extendable arm 11 required to make an initial adjustment of the rate of air flow by means of the fan switch 13. The movable rack 22 is mounted slidably on a guide rail 24 suitably mounted on the side surface of the air conditioner body and is coupled to the air mixing door 7 by a connecting rod 25 attached to an end portion of the movable rack 22.

Figure 3:
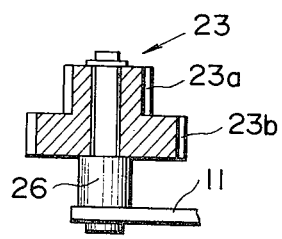
FIG. 3 is a longitudinal cross section of a pinion used in the preferred embodiment according to the present invention shown in FIG. 2.

As shown in FIG. 3, the pinion 23 is mounted pivotally on the extendable arm 11 via a shaft 26. The depth of the third fixed rack 21b in the central portion is indicated by h in the drawing. The fixed racks 21a and 21a' are arranged to project toward the pinion 23 further than the fixed rack 21b by an amount corresponding to the difference in diameter between a large-diameter pinion 23b and small-diameter pinion 23a. Thus in one movement over the total length of racks 21a, 21b and 21a', the pinion 23 remains meshed continuously, first pinion 23a with rack 21a, then pinion 23b with rack 21b, and finally pinion 23a with rack 21a'. In addition, at the changeover positions where the larger-diameter pinion 23b separates from one end of the second fixed rack 21b, the air mixing door 7 is arranged to be moved toward the maximum cooling position or maximum heating position.

In the above configuration, suppose that the air conditioner 1 is operated for temperature adjustment to a preset normal temperature in the case that the extendable arm 11 of the power servomechanism 10 is near its fully extended position, with the air mixing door 7 in the maximum heating position (shown by a phantom line in the drawing). At this time, the small-diameter pinion 23a meshes with both first fixed rack 21a and movable rack 22 so that the large-diameter pinion 23b is free and the air conditioner 1 operates to heat the passenger compartment. As the passenger compartment heats gradually, a signal from temperature sensors not shown in the drawing causes the power servomechanism 10 to shorten its extendable arm 11 and the small-diameter pinion 23a to move rotatingly to the right in the drawing. At this time, sicne the teeth pitches of first and second fixed racks 21a and 21a' at end portions and movable rack 22 are the same, the extendable arm 11 only moves to change the fan speed by means of the fan switch 13 to reduce the rate of air flow of the fan not shown in the drawing.

Therefore, at this stage the temperature control within the passenger compartment is performed only by the adjustment of rate of air flow so that a gradual decrease in temperature can be achieved without abrupt temperature changes.

When an appreciably lower temperature is required, the extendable arm 11 is pulled toward the power servomechanism body and the small-diameter pinion 23a moves out of engagement with the first fixed rack 21a at the left-handed position and the large-diameter pinion 23b engages with the third fixed rack 21b in the central position. The pinion 23 rotates more slowly because of the difference in effective diameters of the small-diameter pinion 23a and large-diameter pinion 23b. The meshing point of the movable rack 22 and small-diameter pinion 23a therefore moves to shift the movable rack 22 in the direction of motion of the extendable arm 11. For example, if the effective diameter ratio between the small-diameter pinion 23a and large-diameter pinion 23b is 1:2, the movable rack 22 is shifted exactly half as fast as the extendable arm 11 moves so that the air mixing door 7 is opened at an angle to lower the temperture within the passenger compartment. In addition, when the temperature within the passenger compartment is required to be lowered much higher, the extendable arm 11 is pulled toward the power servomechanism 10 so that its length is shorter than that described above. At this time, the large-diameter pinion 23b moves out of engagement with the third fixed rack 21b in the central position and the air mixing door 7 is directed to the maximum cooling position (shown by a solid line in the drawing). Furthermore, the small diameter pinion 23a meshes with the second fixed rack 21a' in the righthand position and the extendable arm 11 is pulled into the power servomechanism body without movement of the movable rack 22 so that adjustment of air flow rate of the fan 3 only is made.

Thus it will be seen that when the air mixing door 7 moves to start at the maximum cooling position or at the maximum heating position, the air mixing door 7 is at rest and only the fan 3 is under the adjustment of the rate of air flow while the pinion 23a is meshed with the first and second fixed racks 21a and 21a' at the left and right sides, whereas during the central portion of the stroke of the extendable arm 11, the large-diameter pinion 23b is in mesh with the third fixed rack 21b in the central position and simultaneously the air mixing door 7 is adjusted as the movable rack 22 is moved.

In the first embodiment of the present invention described above, the third fixed rack 21b at the central portion has the same tooth pitch as the movable rack 22. However, in addition to the first embodiment described above, there exist other methods of adjusting the speed ratio of the movable rack 22 to the extendable arm 11.

Figure 4:
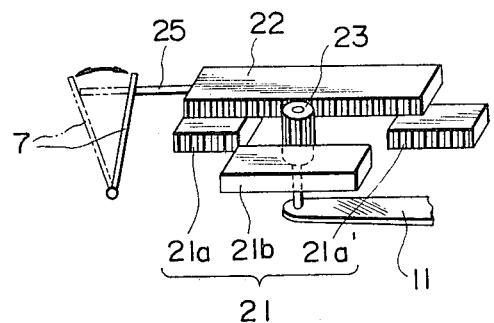
FIGS. 4 and 5 are perspective drawings showing other embodiments of th present invention.

FIG. 4 illustrates a second embodiment of the present invention.

In this embodiment, the third fixed rack 21b in the central portion is located on the opposite side from first and second fixed racks 21a and 21a' in relation to the pinion 23. Consequently, the speed ratio of the movable rack 22 to the pinion 23 is increased. The pinion 23 is pivotally mounted on the extendable arm 11 and its whole length has the same diameter.

In this embodiment, when the first and second fixed racks 21a and 21a' on the left and right sides are disengaged from the pinion 23, the third fixed rack 21b in the central portion is meshed with the pinion 23. Conversely, when the pinion 23 is out of engagement with the third fixed rack 21b, the pinion 23 is meshed with either first or second fixed rack 21a or 21a'. While the pinion 23 rotates in mesh with either first or second fixed rack 21a or 21a' at right and left positions, the movable rack 22 has tooth of the same pitch as the first and second fixed racks 21a and 21a' at the right and left positions so that the movable rack 22 will not move.

It will be seen that when the pinion 23 is transferred from either of the first and second fixed racks 21a and 21a' at the left and right positions to the third fixed rack 21b in the central position, the pinion 23 rotates in the reverse direction and the movable rack 22 rotates to move the air mixing door 7. Therefore, the movable rack 22 is shifted by the extendable arm 11, the speed being four times that of the movable rack 22 of the first embodiment shown in FIG. 2.

Figure 5:
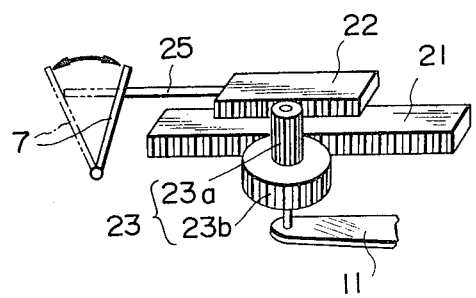
Figure 6:
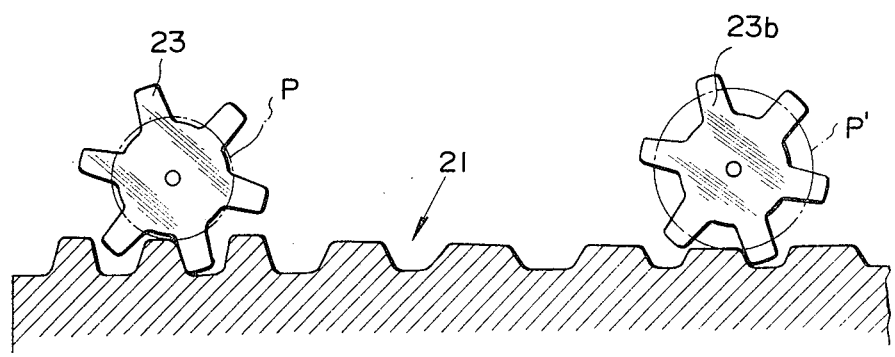
FIG. 6 is an enlarged fragmentary sectional drawing partly showing a fixed rack of FIG. 5.

FIG. 5 and FIG. 6 illustrates a third embodiment of the present invention where a variable pitch rack is used for the fixed rack 21 and is integrally formed as the fixed rack 21. Conventionally, there is known, so called, variable ratio rack and pinion wherein the effective gearing at the point of contact of the rack and pinion is varied continuously by making either or both of the rack pitch and the effective pinion diameter non-constant.

In this embodiment, a variable pitch rack is used for the fixed rack 21 as described before. The teeth formed at each end (portions corresponding to the fixed racks 21a and 21a' described before) make the gear height higher and the pitch narrower. Hence, the pitch diameter P of the large-diameter pinion 23b in mesh with the variable pitch rack is made less than the pitch diameter P' when the large diameter pinion 23b is in mesh with the central portion of the fixed rack 21. Consequently, the speed ratio of the fixed rack 22 in mesh with the small-diameter pinion 23a is considerably reduced.

When the pitch diameter P of large-diameter pinion 23b located at both end portions of the fixed rack 21 has the same pitch diameter of the small-diameter pinion 23a, the movable rack 22 does not move when the pinion 23 is at either end portion of the rack 21 similarly as in the embodiments described previously. The pitch of gear tooth between each fixed rack 21 and movable rack 22 is varied according to the present invention at the middle portion so that the air mixing door 7 can be moved at various angles with respect to the movement of the extendable arm 11.

As described hereinbefore, in an automatic temperature adjusting type air conditioner which makes adjustment of the amount of air flow of a fan according to the stroke of an extendable arm of a power servomechanism together with angular movement of an air mixing door by means of the extendable arm of the power servomechanism, such air conditioner comprises a fixed rack fixed on the air conditioner side and disposed along the approximately full stroke of the extendable arm, a movable rack disposed movably with respect to the fixed rack, and a pinion pivotally mounted on the extendable arm in mesh with both racks described above. During the full stroke on the fixed rack, the tooth pitch or tooth profile of a suitable interval where the pinion is located at the maximum cooling position or maximum heating position of the arm mixing door is made different from other portions so that the movable rack moves or stops together with the pinion rotation and extendable arm. The use of a simple gear mechanism can control the rate of air flow of the fan and the angular movement adjustment of the air mixing door independently of each other. Therefore, before the air mixing door position is changed from the fully opened position to the fully closed position and vice versa, the rate of air flow of the fan can be decreased and the hunting phenomenon of the air temperature within the passenger compartment of an automotive vehicle can be prevented when the temperature is changed while the air mixing door moves from the fully closed position or from the fully opened position. It is, therefore, possible to perform a comfortable automatic temperature control within the passenger compartment. Since the movable rack attached to the air mixing door always stays in mesh with the pinion pivotally mounted on the extendable arm, the air conditioner reliably performs accurate temperature control according to the opening angle of the air mixing door.

It will be fully appreciated by those skilled in the art that the above and other similar modifications may be made in the preferred embodiment described above without departing from the spirit and scope of the present invention, which is to be defined by the appended claims.

What is claimed is:

1. An air conditioner of automatic temperature adjusting type for an automotive vehicle having a mechanism for adjusting an angularly moved air mixing door and air flow rate of a fan independently of each other, which comprises:
    (a) linearly actuating means;
    (b) means for adjusting air flow rate of the fan coupled to said linearly actuating means;
    (c) a pinion pivotally mounted on said linearly actuating means so as to be rotatable about an axis substantially orthogonal to the direction in which said linearly actuating means moves;
    (d) a fixed rack meshed with said pinion throughout substantially whole range of the movement of said linearly actuating means; and
    (e) a movable rack meshed with said pinion and connected to the air mixing door; and
    (f) means for substantially disabling the movement of said movable rack near the both end positions of said fixed rack,
    whereby said movable rack does not move when said pinion is rotatingly moved over each of end portions of said fixed rack, whereas over an intermediate portion of the movement and said linearly actuating means said movable rack moves through a distance corresponding substantially to the whole adjusting range of the air mixing door.

2. An air conditioner of automatic temperature adjusting type for an automotive vehicle as set forth in claim 1, wherein the pitch of said movable rack is substantially uniform and said fixed rack comprises:
    (g) a first fixed rack located at one end portion for the air mixing door at a fully opened position to maximize cooling operation having the same gear pitch as that of said movable rack;
    (h) a second fixed rack located at another end portion for the air mixing door at a fully closed position to maximize heating operation having the same gear pitch as that of said movable rack; and
    (i) a third fixed rack located at a middle position for the air mixing door at an air mixing position;

3. An air conditioner of automatic temperature adjusting type for an automotive vehicle as set forth in claim 2, wherein said pinion assembly has the height capable of meshing with said first, second, and third fixed racks and is integrally formed of a small-diameter pinion always staying in mesh with said movable rack, a large-diameter pinion meshed with said third fixed rack only and a shaft, whereby the difference in the circular pitch diameter between the large-diameter pinion and small-diameter pinion causes mismatching of said large-diameter pinion with said third fixed rack to move said movable rack.

4. An air conditioner of automatic temperature adjusting type as set forth in claim 2, wherein said third fixed rack is located at an opposite side of said first and second fixed racks and said pinion of pinion assembly has throughout the same diameter so that a rotating direction is reversed when the mating of said pinion is transferred from either of said first and second racks to said third fixed rack;

whereby said movable rack can move speedly.

5. An air conditioner of automatic temperature adjusting type as set forth in claim 1, wherein said fixed rack is constructed integrally as a rack with non-uniform pitch.

* * * * *